(12) United States Patent
Sajassi et al.

(10) Patent No.: US 8,619,595 B2
(45) Date of Patent: Dec. 31, 2013

(54) FAULT ISOLATION IN TRILL NETWORKS

(75) Inventors: Ali Sajassi, San Ramon, CA (US);
Samer Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 997 days.

(21) Appl. No.: 12/658,503

(22) Filed: Feb. 5, 2010

(65) Prior Publication Data
US 2011/0194403 A1 Aug. 11, 2011

(51) Int. Cl.
*G01R 31/08* (2006.01)
(52) U.S. Cl.
USPC ............................ 370/248; 370/242; 370/249
(58) Field of Classification Search
USPC ......... 370/224, 241, 242, 244, 248–252, 401;
709/224
See application file for complete search history.

(56) References Cited

U.S. PATENT DOCUMENTS

| | | | |
|---|---|---|---|
| 2005/0169188 A1* | 8/2005 | Cometto et al. | 370/249 |
| 2007/0127502 A1* | 6/2007 | Zhu | 370/397 |
| 2010/0165995 A1* | 7/2010 | Mehta et al. | 370/400 |
| 2010/0226381 A1* | 9/2010 | Mehta et al. | 370/401 |
| 2010/0271960 A1* | 10/2010 | Krygowski | 370/248 |

OTHER PUBLICATIONS

Anoop Ghanwani "TRILL OAM", Mar. 24, 2009.*
Radia Perlman "Rbridge Base protocol specification" Jun. 2007.*
RBridges: Base Protocol Specification <draft-ietf-trill-rbridge-protocol-13.txt>, IETF Draft, Perlman et al., Jun. 26, 2009.
Traceroute Using an IP Option, IETF RFC 1393, G. Malkin, Jan. 1993.

* cited by examiner

*Primary Examiner* — Awet Haile
(74) *Attorney, Agent, or Firm* — Cindy Kaplan

(57) ABSTRACT

In one embodiment, a method includes generating at an ingress routing bridge in a TRansparent Interconnection of Lots of Links (TRILL) network, a trace message for a specified flow along a path from the ingress routing bridge to a destination reachable through the TRILL network, transmitting a single trace message from the ingress routing bridge to a next-hop routing bridge in the TRILL network, receiving a plurality of reply messages in response to the transmitted trace message, and identifying the routing bridges in the path and a location of any fault in the path. An apparatus for fault isolation in a TRILL network is also disclosed.

13 Claims, 6 Drawing Sheets

FAULT ISOLATION IN TRILL NETWORKS

BACKGROUND

The present disclosure relates generally to communication networks, and more particularly to fault isolation in computer networks.

Communication networks are rapidly growing in use and complexity. In order to reduce the impact of network failures, it is important to be able to identify a location of the failure (e.g., localize fault to a specific node, port, or link) in the network so that it can be resolved. TRansparent Interconnection of Lots of Links (TRILL) networks are one example of networks in which fault isolation is desired.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
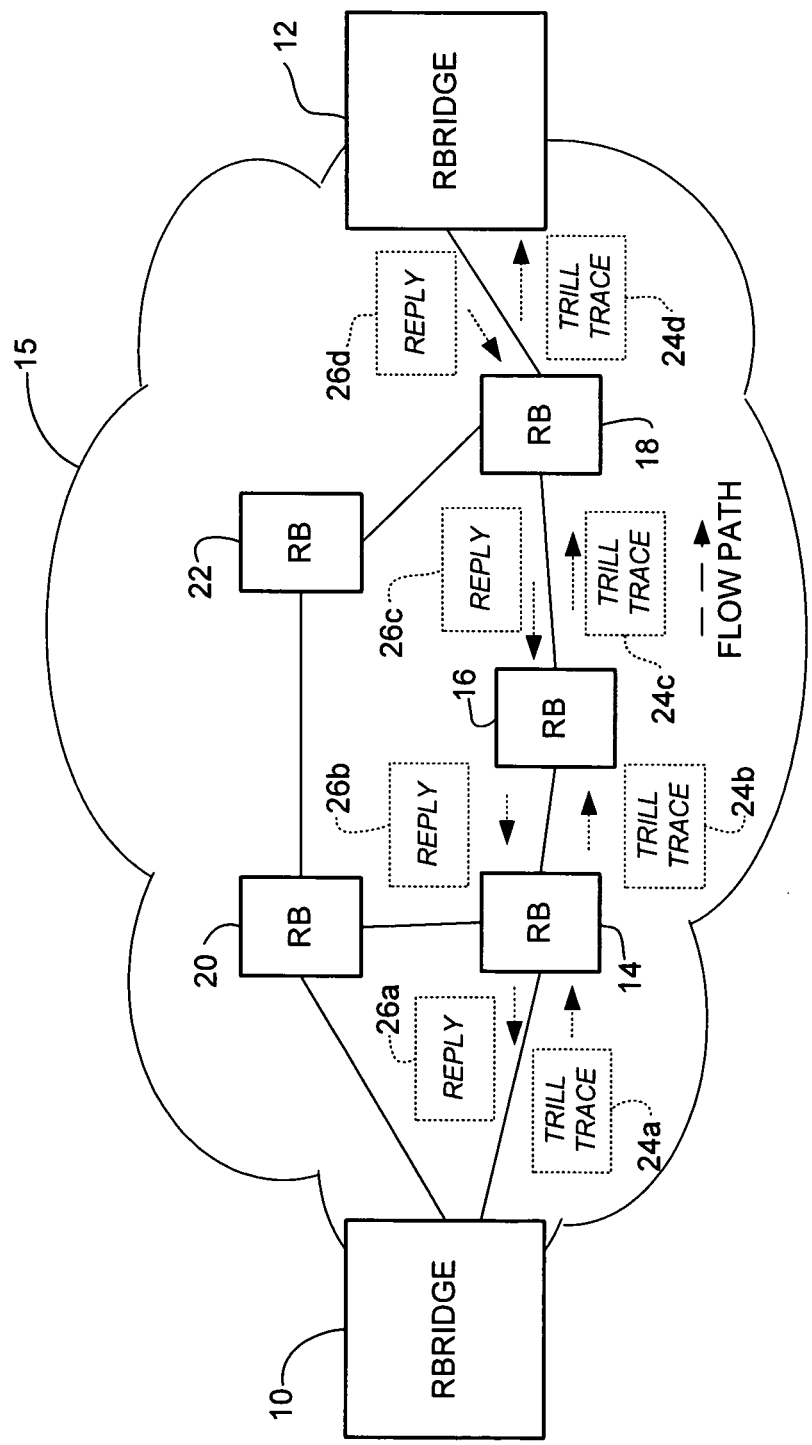
FIG. 1 illustrates an example of a network in which embodiments described herein may be implemented.

In one embodiment, a method generally comprises generating at an ingress routing bridge in a TRansparent Interconnection of Lots of Links (TRILL) network, a trace message for a specified flow along a path from the ingress routing bridge to a destination reachable through the TRILL network, transmitting a single trace message from the ingress routing bridge to a next-hop routing bridge in the TRILL network, receiving a plurality of reply messages in response to the transmitted trace message, and identifying routing bridges in the path to the destination and a location of any fault in the path.

In another embodiment, an apparatus generally comprises a processor for generating a trace message for a specified flow along a path from the apparatus to a destination reachable through a TRILL network, transmitting a single trace message from the ingress routing bridge to a next-hop routing bridge in the TRILL network, receiving a plurality of reply messages in response to said transmitted trace message, and identifying routing bridges in the path to the destination and a location of any fault in the path, and memory for storing path information received in the reply messages.

In another embodiment, an apparatus generally comprises a processor for receiving a trace message for a specified flow along a path from an ingress routing bridge to a destination reachable through a TRILL network, performing a lookup in a forwarding information base to identify a next-hop routing bridge, transmitting a reply message identifying a hop count and an identifier of the next-hop routing bridge, updating the trace message, and forwarding the updated trace message to the next-hop routing bridge.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other embodiments and applications without departing from the scope of the invention. Thus, the invention is not to be limited to the embodiments shown, but is to be accorded the widest scope consistent with the principles and features described herein. For purpose of clarity, details relating to technical material that is known in the technical fields related to the embodiments have not been described in detail.

TRILL (TRansparent Interconnection of Lots of Links) is an IETF (Internet Engineering Task Force) protocol implemented by devices referred to as Routing Bridges or RBridges (see, for example, RBridges: Base Protocol Specification, draft-ietf-trill-RBridge-protocol-14.txt, R. Perlman et al., Oct. 26, 2009). TRILL introduces new data and control planes for Ethernet networks.

Conventional methods used for fault isolation in classical Ethernet do not work in TRILL networks. For example, conventional linktrace defined in IEEE standard 802.1ag-2007 (Connectivity Fault Management (CFM)) assumes congruency of unicast and multicast paths in an Ethernet network and symmetry of forward and reverse paths. Conventional Ethernet CFM assumes the presence of a single path for a given VLAN between a source and a destination, as set up by the spanning tree protocol. These conditions commonly do not apply to TRILL networks.

The embodiments described herein provide fault isolation in TRILL networks using flow based path tracing. The embodiments provide fault isolation in Ethernet networks including networks with ECMP (Equal Cost Multi-Path) and networks that do not enforce unicast/multicast congruency or forward/reverse path symmetry.

Referring now to the drawings, and first to FIG. 1, an example of a network 15 in which embodiments described herein may be implemented is shown. The embodiments described herein operate in the context of a data communication network including multiple network devices. Some of the devices in the network may be RBridges, switches, bridges, routers, gateways, or other network devices. The network device may include, for example, a master central processing unit (CPU), memory, interfaces, and a bus. In one embodiment, the network device is implemented on a general purpose machine as described below with respect to FIG. 6.

In one embodiment, the network 15 is a TRILL network and the network devices are RBridges. The network 15 shown in FIG. 1 includes RBridge 10 and RBridge 12 located at an edge of the network, and a plurality of internal RBridges 14, 16, 18, 20, 22. The edge RBridges 10, 12 may operate as ingress and egress nodes, respectively, for a flow entering the network 15 at RBridge 10 and leaving the network at RBridge 12, for example. The RBridges 10, 12 are TRILL Maintenance End Points (T-MEPs) and the internal nodes 14, 16, 18, 20, 22 are TRILL Maintenance Intermediate Points (T-MIPs). T-MEPs are located at the edge of the TRILL network and are active endpoints which source TRILL-OAM (Operations, Administration, and Maintenance) frames. T-MIPs are located internal to the network and are passive endpoints which only respond to TRILL-OAM messages when invoked.

In one embodiment, a TRILL path tracing function is initiated from a T-MEP and targets a T-MEP or a T-MIP. The path tracing function is configured to discover hop-by-hop the path taken by a specific network flow from the source T-MEP to the destination T-MEP/T-MIP. From the perspective of the initiating T-MEP, the path tracing is conducted in the context of not only a VLAN (Virtual Local Area Network) and destination (e.g., destination MAC address), but instead in the context of a flow. This accounts for ECMP in TRILL networks. The flow may be defined based on a destination RBridge, VLAN, source MAC address, and destination MAC address, for example. The MAC address may be a genuine customer MAC address or a test MAC address allocated from a reserved range. As described below, the replying T-MIP/T-MEP looks up the initiating RBridge's nickname in its FIB (Forwarding Information Base) in order to determine which port to send out the reply message. This accounts for the fact that TRILL networks do not enforce forward/reverse path symmetry.

An example of trace packets and reply packets used in the path tracing process are shown in FIG. 1. The ingress RBridge 10 generates and transmits a single TRILL trace packet (referred to herein as 'route request' or 'trace request') 24a to its next-hop RBridge 14. RBridge 14 transmits a reply packet 26a back to the ingress RBridge 10 initiating the path tracing operation. The RBridge 14 also transmits a TRILL trace packet 24b to its next-hop RBridge 16, which in turn transmits a reply packet 26b back to the ingress RBridge 10. Since the T-MIPs relay the trace request messages, there is no need for the T-MEP originating the path tracing to send a plurality of trace request messages. This minimizes the load on the originating node and the number of requests relayed by intermediate nodes.

The path tracing process continues, with RBridges 16, 18 transmitting TRILL trace packets 24c, 24d, until the egress RBridge 12 (destination) is reached. RBridges 18 and 12 also transmit a reply packet 26c, 26d to ingress RBridge 10. RBridge 10 chains the responses together to formulate the flow path and identify any faults within the path. Details of the TRILL trace packets 24a, 24b, 24c, 24d, and reply packets 26a, 26b, 26c, 26d are described below.

Figure 2:
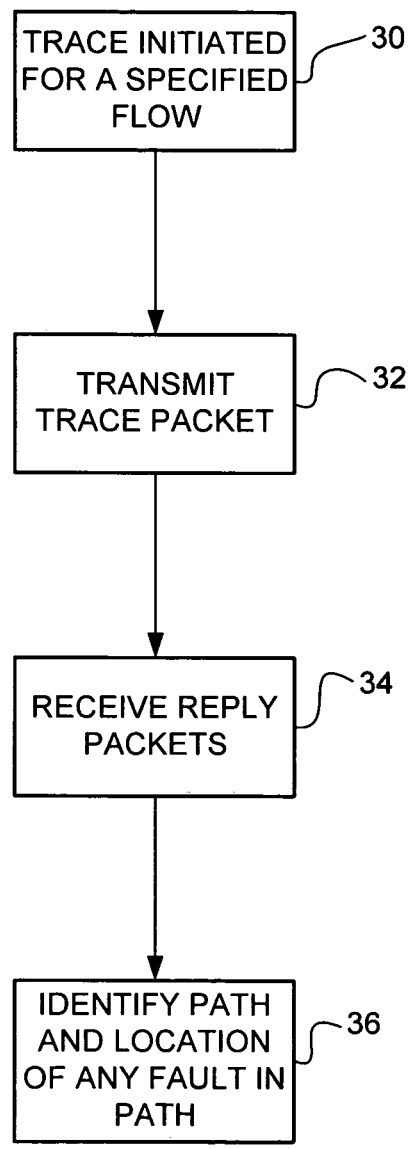
FIG. 2 is a flowchart illustrating a process for fault isolation at an ingress node in the network of FIG. 1, in accordance with one embodiment.

FIG. 2 is a flowchart illustrating an overview of a fault isolation process at a node initiating tracing of a flow path in a TRILL network, in accordance with one embodiment. At step 30, the path tracing process is initiated at a T-MEP (e.g., ingress RBridge 10) for a specified flow. The RBridge 10 generates and transmits a single trace packet (trace request) 24a (step 32). The trace request is relayed hop-by-hop by the T-MIPs (14, 16, 18). The trace packet 24a includes, for example, a hop-count and an identifier of the RBridge transmitting/relaying the trace packet. Each T-MIP that receives the trace request performs a lookup in its local FIB to identify how to forward the request and reports back to the initiator (RBridge 10). The FIB lookup may be based on the Egress RBridge Nickname in the TRILL frame, for example. The reply packet 26a includes, for example, the ingress port and egress port at the RBridge transmitting the reply packet, next-hop RBridge, and hop count. The RBridge 10 receives a plurality of reply packets 26a, 26b, 26c, 26d from the RBridges 14, 16, 18, 12 in the flow path (step 34). The initiating node (RBridge 10) chains the reply packets together and formulates the path (step 36). The initiator uses the information from the reply packets to build a path map and deduce the locality of any faults in the path.

The path tracing process provides path information for a uni-directional path from RBridge 10 to RBridge 12. RBridge 12 may also perform a path tracing operation to identify a path from RBridge 12 to RBridge 10, for example.

The reply messages are transmitted according to the FIB rather than the receiving interface, therefore, they may be transmitted along a different path than the path of the TRILL trace messages. In one embodiment, the reply messages from the T-MIPs are not flow-based. The T-MEP may send a flow-based reply if requested by the initiating node, for example. Since the T-MIPs utilize the FIB for reporting next-hop information back to the originating node, there is no need for a T-MIP continuity check database (CCDB) because there is no FDB (Filtering Database) aging as with conventional Ethernet.

Figure 3:
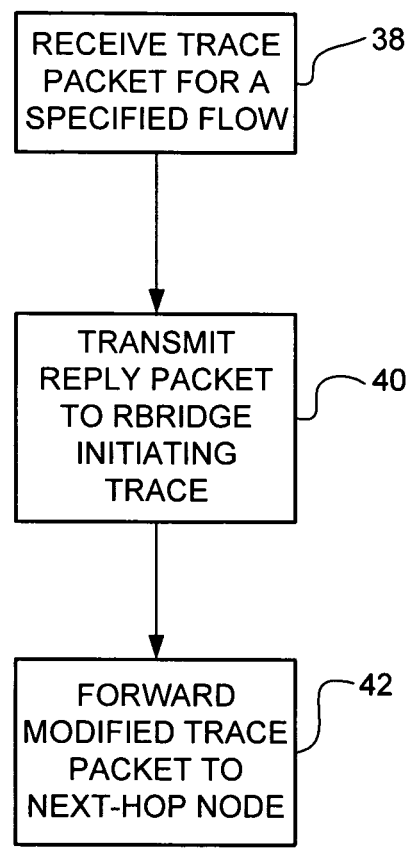
FIG. 3 is a flowchart illustrating a fault isolation process at an intermediate node of the network of FIG. 1, in accordance with one embodiment.

FIG. 3 is a flowchart illustrating the fault isolation process from the viewpoint of a T-MIP in the flow path of the path tracing operation. At step 38, the RBridge (e.g., T-MIP 14) receives a trace packet 24a for a specified flow. The T-MIP 14 transmits a reply packet 26a to the node initiating the route tracing (e.g., T-MEP 10) (step 40). The node 14 also transmits a modified trace packet 24b to the next-hop RBridge 16 (step 42).

The path tracing process may be initiated upon identification of a fault in a network flow or the process may be performed at periodic intervals. In one example, keepalive messages are transmitted periodically between the ingress and egress nodes 10, 12 and the path tracing process is initiated when a fault is reported. A network administrator may initiate path tracing on an RBridge that hosts a T-MEP for the VLAN in question, for example. If the administrator is using actual customer MAC addresses, there is no need to supply the target RBridge nickname. This is because the destination RBridge nickname can be looked up in the Layer 2 FIB of the ingress RBridge based on the customer destination MAC address. If the administrator uses test MAC addresses, the target RBridge nickname is supplied by the user. The path tracing operation has the source nickname set to the initiating RBridge.

In TRILL networks, load balancing over ECMPs can be performed on Layer 2 (L2), Layer 3 (L3), or Layer 4 (L4) fields, or a combination thereof. Thus, fault isolation and path discovery are performed in the context of a specific traffic flow. The TRILL trace message includes the same L2 fields (MAC Source Address, MAC Destination Address, VLAN), L3 fields (IP source address, IP Destination Address), and L4 fields (Source Port, Destination Port) as the actual flow being tested. The trace and reply messages are preferably both stand alone Layer 2 control messages.

Figure 4:
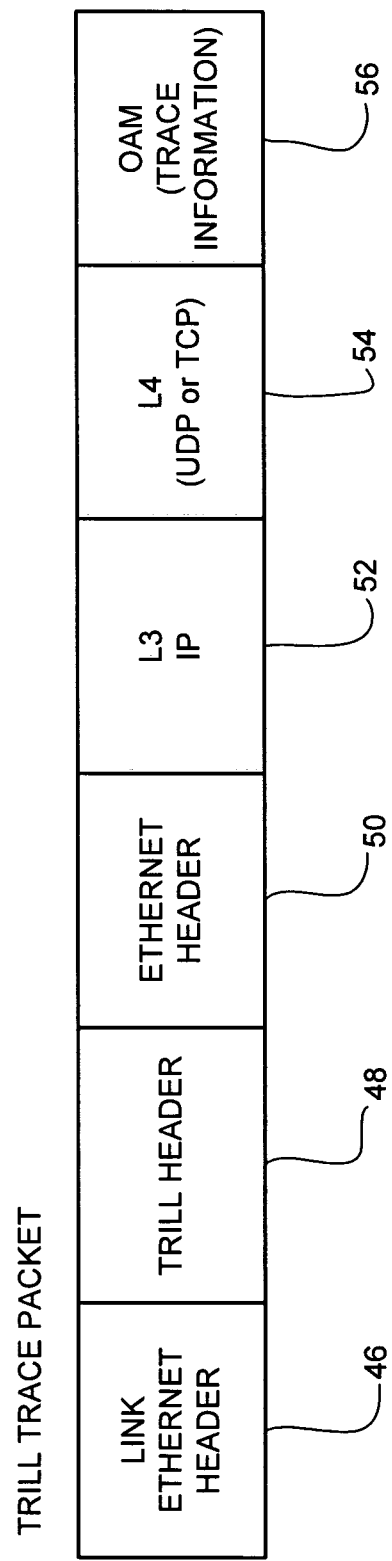
FIG. 4 illustrates an example of a frame format of a trace packet for use in the fault isolation process of FIG. 2, in accordance with one embodiment.

FIG. 4 illustrates an example of a format for the TRILL trace packet 24a, 24b, 24c, 24d, in accordance with one embodiment. The packet includes a link local Ethernet header (outer Ethernet header) 46, TRILL header 48, inner Ethernet header 50, L3 (IP) fields 52, L4 fields (UDP or TCP) fields 54, and OAM fields 56. The link Ethernet header 46 includes a destination address (DA) for the next-hop RBridge, source address (SA) (transmitting node), VLAN tag information, and Ethertype. The TRILL header 48 includes Ethertype=TRILL, egress RBridge nickname, ingress RBridge nickname, TTL (time-to-live), reserved bits, options, and a multicast bit. The egress RBridge nickname maps to the T-MEP of the egress RBridge for the specified flow. The inner Ethernet header 50 includes a destination address and a source address designating the flow (either a customer flow or a test flow). The L3 and L4 fields 52, 54 are populated per flow identity. The OAM field 56 includes a hop count and an identifier of the RBridge transmitting/relaying the trace packet. Additional information may be included in the OAM fields 56.

In one embodiment, the trace packet is distinguished from a data packet by a special reserved bit in the TRILL header 48. The reserved bit is set to indicate that the packet is an OAM frame. The trace packet is also transmitted with the TTL equal to one. The T-MIPs decrement TTL by one and punt the expired frame to the CPU as part of the normal TRILL processing. Once the CPU identifies that the OAM bit is set, the frame is redirected to an OAM process at the RBridge. Thus, the TRILL trace packet is identified based on the expired TTL and the set OAM reserved bit.

The T-MIP updates the trace packet before forwarding the packet to its next-hop RBridge. For example, the T-MIP may reset the TTL in the trace packet to one and update the hop count, sender identifier, and link Ethernet header (SA, DA) before forwarding the trace packet to its next-hop RBridge.

Figure 5A:
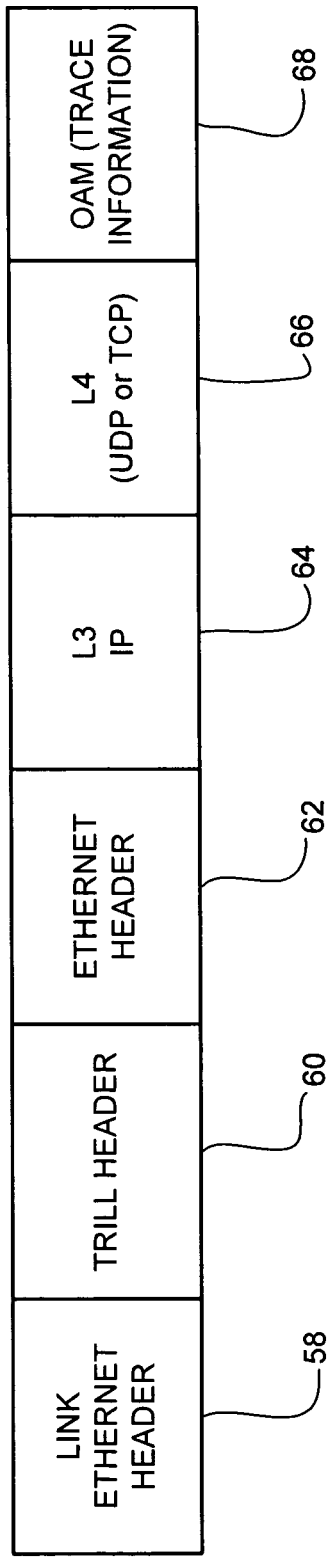
FIG. 5A illustrates an example of a frame format of a reply packet for use in the fault isolation process of FIG. 2, in accordance with one embodiment.
Figure 5B:
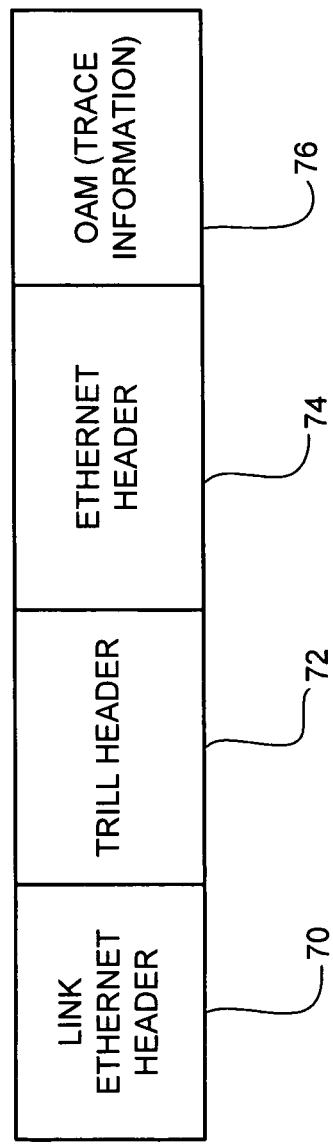
FIG. 5B illustrates another example of a frame format of the reply packet, in accordance with one embodiment.

FIGS. 5A and 5B illustrate examples of frame formats for the TRILL trace reply packets. The format shown in the example of FIG. 5A includes a link Ethernet header 58, TRILL header 60, inner Ethernet header 62, L3 fields 64, L4 fields 66, and OAM fields 68. In this example, the reply packet is the same as the trace packet, but with source and destination addresses swapped for MAC address, IP addresses, and L4 ports. Also, the content of the OAM fields in the reply are typically different from the trace request.

The reply packet format shown in FIG. 5B is a control message that includes a link Ethernet header 70, TRILL header 72, internal Ethernet header 74 (with a special TRILL OAM Ethertype), and OAM fields 76.

The OAM fields 68, 76 may include, for example, ingress port (including status), egress port (including status), next-hop information (this will be empty for reply sent from destination node), and hop-count. In one embodiment, the next-hop information comprises a TRILL IS-IS (Intermediate System-to-Intermediate System) router ID of the next-hop to which the request has been relayed. This allows the initiator of the trace to chain the replies together and identify any missing replies. If an RBridge that does not support TRILL trace as described herein, is interposed between two RBridges which do support TRILL trace, the RBridge can still be discovered since its IS-IS router ID is known to its peers.

It is to be understood that the formats shown in FIGS. 4, 5A, and 5B are only examples and other formats or different fields may be used without departing from the scope of the embodiments.

Figure 6:
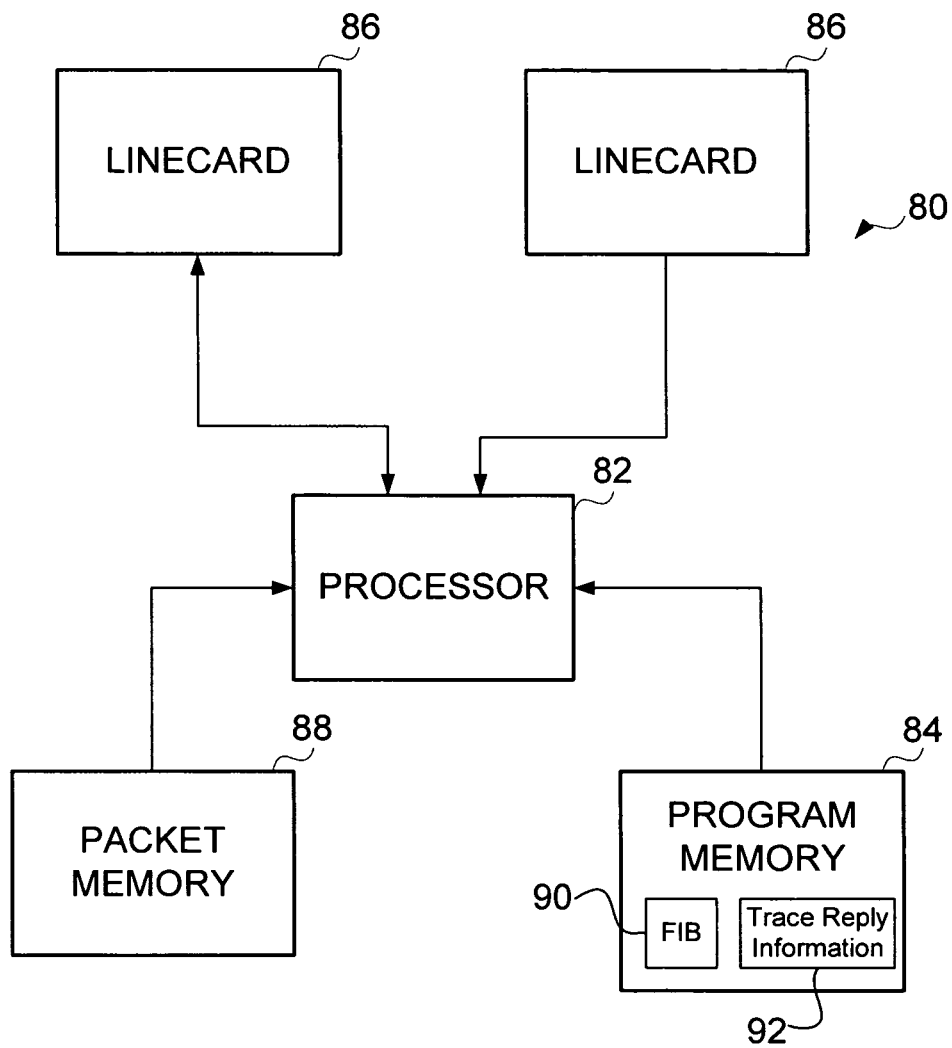
FIG. 6 depicts an example of a network device useful in implementing embodiments described herein.

FIG. 6 depicts a network device 80 (e.g., RBridge) that may be used to implement embodiments described herein. Network device 80 is configured to implement all of the network protocols and extensions thereof described above. In one embodiment, network device 80 is a programmable machine that may be implemented in hardware, software, or any combination thereof. Logic may be encoded in one or more tangible media for execution by a processor or multiple processors. For example, processor 82 may execute codes stored in a program memory 84. Program memory 84 is one example of a computer-readable medium. Program memory 84 can be a volatile memory. Another form of computer-readable medium storing the same codes is a type of non-volatile storage such as floppy disks, CD-ROMs, DVD-ROMs, hard disks, flash memory, etc. The memory may store the FIB 90 and trace information 92 received in the reply messages at the T-MEP, for example.

Network device 80 interfaces with physical media via a plurality of linecards (network interfaces) 86. Linecards 86 may incorporate Ethernet interfaces, DSL interfaces, Gigabit Ethernet interfaces, 10-Gigabit Ethernet interfaces, SONET interfaces, etc. As packets are received, processed, and forwarded by network device 80, they may be stored in a packet memory 88. To implement functionality according to the system, linecards 86 may incorporate processing and memory resources similar to those discussed above in connection with the network device as a whole. It is to be understood that the network device 80 shown in FIG. 6 and described above is only one example and that different configurations of network devices may be used.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
generating at an ingress routing bridge in a TRansparent Interconnection of Lots of Links (TRILL) network, a trace message for a specified flow along a path from the ingress routing bridge to a destination reachable through the TRILL network;
transmitting the trace message from the ingress routing bridge to a next-hop routing bridge in the TRILL network;
receiving at the ingress routing bridge, a plurality of reply messages from routing bridges in response to transmitting said trace message; and
chaining said plurality of reply messages together to formulate said path and identify the routing bridges in said path and a location of any fault in said path;
wherein each of said plurality of reply messages comprises a TRILL header, identification of an ingress port and egress port at a routing bridge transmitting the reply message, a next-hop routing bridge identifier, and a hop count contained in an Operations, Administration, and Maintenance (OAM) field, the reply message transmitted based on a lookup in a forwarding information base at the routing bridge.

2. The method of claim 1 wherein generating said trace message comprises setting a bit in a TRILL header to identify said trace message as an Operations, Administration, and Maintenance (OAM) packet.

3. The method of claim 1 wherein generating said trace message comprises setting a time-to-live in a TRILL header to one.

4. The method of claim 1 wherein said trace message comprises a hop count and an identifier of the ingress routing bridge transmitting said trace message.

5. The method of claim 1 wherein the next-hop routing bridge is configured to update said trace message and forward said updated trace message to its next-hop routing bridge.

6. The method of claim 1 wherein said plurality of reply messages are received from the routing bridges in said path.

7. An apparatus comprising:
a processor for generating a trace message for a specified flow along a path from the apparatus to a destination reachable through a TRansparent Interconnection of Lots of Links (TRILL) network, transmitting the trace message to a next-hop routing bridge in the TRILL network, receiving a plurality of reply messages in response to transmitting said trace message, and chaining said plurality of reply messages together to formulate said path and identify routing bridges in said path and a location of any fault in said path; and memory for storing path information received in said plurality of reply messages;

wherein each of said plurality of reply messages comprises a TRILL header, identification of an ingress port and egress port at a routing bridge transmitting the reply message, a next-hop routing bridge identifier, and a hop count contained in an Operations, Administration, and Maintenance (OAM) field, the reply message transmitted based on a lookup in a forwarding information base at the routing bridge.

8. The apparatus of claim 7 wherein said trace message comprises a bit set in a TRILL header to identify said trace message as an OAM packet.

9. The apparatus of claim 7 wherein a time-to-live in said trace message is set to one.

10. The apparatus of claim 7 wherein said trace message comprises a hop count and an identifier of the ingress routing bridge transmitting said trace message.

11. A routing bridge comprising:

a processor for receiving a trace message for a specified flow along a path from an ingress routing bridge to a destination reachable through a TRansparent Interconnection of Lots of Links (TRILL) network, performing a lookup in a forwarding information base to identify a next-hop routing bridge, transmitting a reply message to the ingress routing bridge, updating said trace message, and forwarding said updated trace message to a next-hop routing bridge; and memory for storing the forwarding information base;

wherein the trace message comprises hop count and an identifier of the ingress routing bridge transmitting said trace message;

wherein the ingress routing bridge is operable to identify a location of any fault in said path based on the reply message;

wherein the reply message comprises, a TRILL header, identification of an ingress port and egress port at the routing bridge transmitting the reply message, the next-hop routing bridge identifier, and Operations, Administration, and Maintenance (OAM) field.

12. The routing bridge of claim 11 wherein said trace message comprises a bit set in a TRILL header to identify said trace message as an OAM packet.

13. The routing bridge of claim 11 wherein a time-to-live in said trace message is set to one.

* * * * *